United States Patent
Baxter

(12) 
(10) Patent No.: US 10,451,456 B2
(45) Date of Patent: Oct. 22, 2019

(54) LEAK DETECTION, CONTROL AND PURGE

(71) Applicant: 355323 B.C. Ltd., Richmond (CA)

(72) Inventor: Robert Baxter, Surrey (CA)

(73) Assignee: 355323 B.C. Ltd., Richmond, BC (CA)

(*) Notice: Subject to any disclaimer, the term of this patent is extended or adjusted under 35 U.S.C. 154(b) by 277 days.

(21) Appl. No.: 15/200,011

(22) Filed: Jul. 1, 2016

(65) Prior Publication Data

US 2017/0003693 A1    Jan. 5, 2017

Related U.S. Application Data

(60) Provisional application No. 62/187,578, filed on Jul. 1, 2015.

(51) Int. Cl.
| | | |
|---|---|---|
| *F15D 1/00* | (2006.01) | |
| *G01F 1/00* | (2006.01) | |
| *G01M 3/28* | (2006.01) | |

(52) U.S. Cl.
CPC ............. *G01F 1/00* (2013.01); *G01M 3/2807* (2013.01)

(58) Field of Classification Search
CPC ................................ G01F 1/00; G01M 3/2807
See application file for complete search history.

(56) References Cited

U.S. PATENT DOCUMENTS

| | | | |
|---|---|---|---|
| 4,297,686 A | 10/1981 | Tom | |
| 4,319,232 A | 3/1982 | Westphal et al. | |
| 5,008,650 A | 4/1991 | Hoiberg | |
| 5,038,831 A | 8/1991 | Masson | |
| 5,153,564 A | 10/1992 | Hoiberg | |
| 6,025,788 A | 2/2000 | Diduck | |
| 2008/0271238 A1* | 11/2008 | Reeder | ..................... A46B 7/04 4/597 |
| 2016/0349140 A1* | 12/2016 | Teymouri | ............ G01M 3/2807 |

FOREIGN PATENT DOCUMENTS

| | | |
|---|---|---|
| EP | 1561087 B1 | 6/2006 |
| WO | 2004046656 A1 | 6/2004 |

* cited by examiner

*Primary Examiner* — P. Macade Nichols
(74) *Attorney, Agent, or Firm* — Crawford Maunu PLLC

(57) ABSTRACT

Aspects of the present disclosure are directed toward mitigating water escapement. As may be implemented in accordance with one or more embodiments, an apparatus and/or method involve detecting liquid flow in a liquid channel, and controlling the flow of liquid through the liquid channel with a liquid flow valve in response to control inputs. In response to indicated liquid flow, mitigating the detected liquid flow based upon at least one input variable, each input variable characterizing operational conditions of a premises in which the liquid flow is detected. One or more of control of the flow-arresting circuit and reporting of liquid flow characteristics provided by the flow-arresting circuit are provided via communications with a remote user.

18 Claims, 4 Drawing Sheets

LEAK DETECTION, CONTROL AND PURGE

OVERVIEW

Various aspects of the present disclosure are directed to detecting water escapement, such as water leaks or other water/liquid flow, which can be useful for mitigating damage that may be caused by the water, as well as for reducing water loss. For instance, detecting water escapement in a residential or commercial building can be particularly useful for mitigating damage that escaping water can cause when otherwise going unnoticed, such as when occupants are sleeping, gone or when portions of buildings are incomplete or otherwise unoccupied.

Various embodiments are directed to addressing challenges that arise during construction, such as for high-rise and other buildings, in which financial loss may result due to water escape that may occur during times when a building or portion of a building is unoccupied. For instance, potable water systems in buildings may be pressurized and active as water service is extended to each new floor for tradespeople doing masonry work, cleaning and maintenance of various systems that employ makeup water connections. A building under construction is especially vulnerable to quality issues arising as new plumbing lines are extended, and appliances and devices are connected. Water escaping on upper floors may cause damage on lower floors that may be further along in the construction progress, such as damage to flooring, millwork, ceilings, baseboards and walls. For instance, small water lines that may burst on upper floors can run overnight or during longer periods during which thousands of gallons of water may escape and cause extensive damage, requiring restoration. Depending on the severity of damage and the time remaining to complete, further costs may be incurred for delay claims, opportunity loss and borrowing costs. Further, while physical monitoring approaches have been implemented, they can be costly and subject to failure. Accordingly, various embodiments are directed to addressing these challenges.

As may be implemented in accordance with various embodiments, a method and/or apparatus involve detecting liquid flow in a liquid channel, and controlling the flow of liquid through the liquid channel with a liquid flow valve in response to control inputs as follows. Based on and/or in response to the detected liquid flow, the liquid flow valve is controlled to mitigate the detected liquid flow based upon at least one input variable, each input variable characterizing operational conditions of a premises in which the liquid flow is detected. Further, communications are made with a remote user for providing one or more of control of the liquid flow and reporting of liquid flow characteristics provided by the flow-arresting circuit. Certain embodiments further involve purging liquid from the liquid channel in response to the liquid flow and based upon the operational conditions.

Liquid flow can be mitigated using a variety of approaches. In some embodiments, a rate of detected liquid flow is reported to the remote user, with the rate being indicative of a type of water escapement. The liquid flow valve is controlled by the remote user to mitigate the detected liquid flow, using an input variable provided by the remote user in response to the reported rate of detected flow and based on the operational conditions of the premises.

In some embodiments, an amount of water flowing in the liquid channel is determined by converting an output signal from a liquid flow detector circuit into a value indicative of the amount of water flow, and a threshold amount of flow is determined by selecting one of a plurality of predefined threshold amounts, therein determining the threshold amount based upon the operational conditions of the premises. This may involve using the at least one input variable to select the one of a plurality of predefined threshold amounts. In response to the determined amount of water flowing exceeding the threshold, a timer is initiated while continuing to determine the amount of water flowing by converting the output signal. If an amount of water flowing exceeds the threshold for a predetermined amount of time as indicated via the timer, a signal is sent to the liquid control valve that causes the liquid control valve to terminate water flow.

Various embodiments involve controlling a liquid flow valve in response to detecting water flow in a fire protection water supply based on a first variable characterizing a fire protection condition, controlling the liquid flow valve in response to detecting water flow in a domestic water supply based on a second variable that is different than the first variable. The respective variables may, for example, relate to safety concerns or expected flow in each supply.

Various embodiments involve monitoring fire conditions as follows. In response to detecting liquid flow above a first threshold indicative of water escapement and below a second threshold corresponding to an amount of liquid flow through a fire sprinkler, the liquid flow valve is closed. This condition may be indicative of water escapement at a level that does not indicate activation of a sprinkler. When liquid flow above the second threshold is detected (e.g., where the second threshold corresponds to a flowrate from a fire sprinkler), it is determined that a fire sprinkler is active and the liquid flow valve is controlled to allow liquid flow through the liquid channel.

The above discussion is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
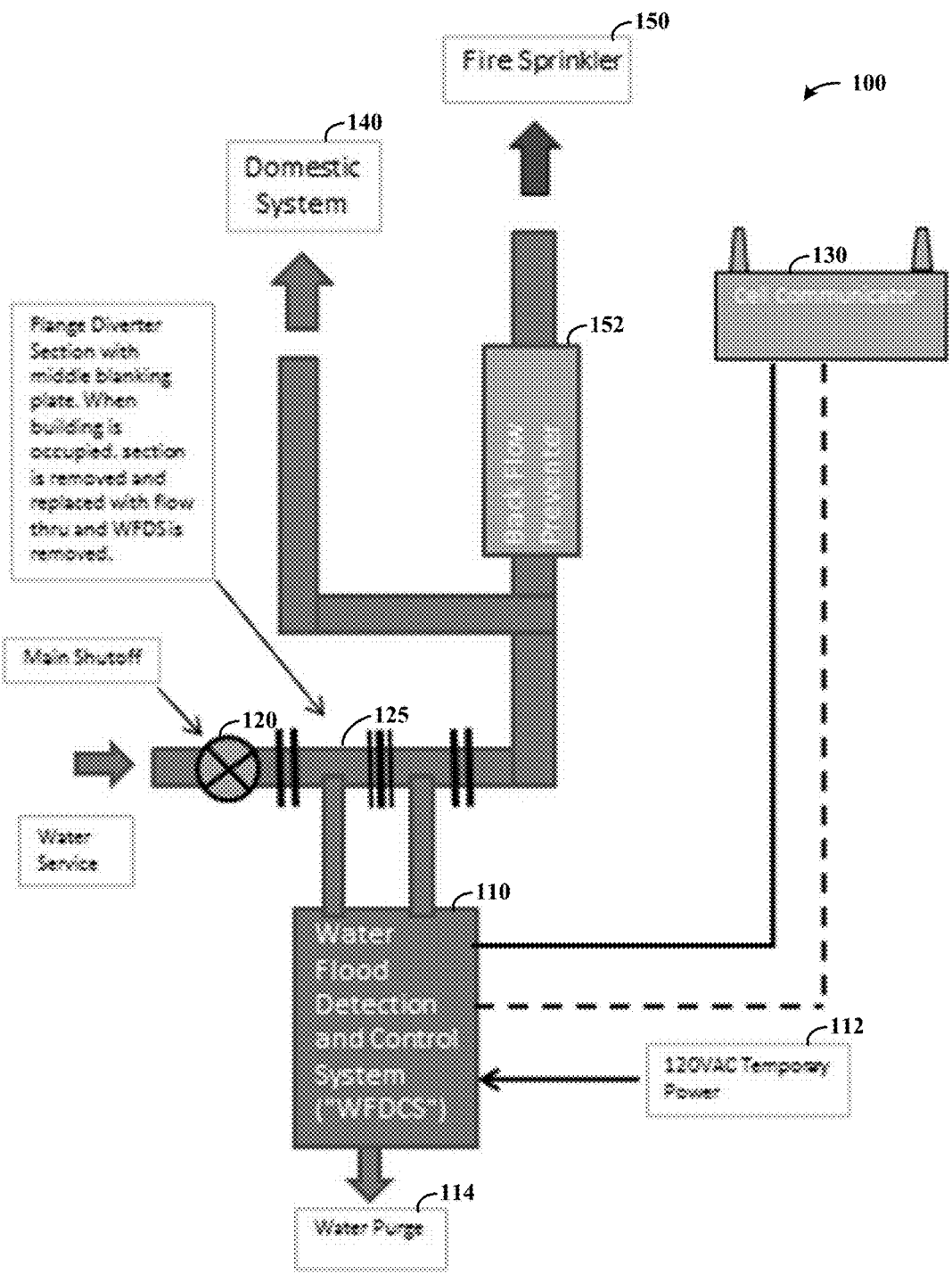
FIG. 1 shows an example apparatus/system involving a water flow/escape detection and control system, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving detection and mitigation of water escape or other liquid-related escape. In certain implementations, aspects of the present disclosure have been shown to be beneficial when used in the context of buildings under construction or otherwise susceptible to undetected water escapement (e.g., premises that are unoccupied for short or long periods of time). While not necessarily so limited, various aspects may be appreciated through a discussion of examples using such exemplary contexts.

According to various example embodiments, aspects of the present disclosure are directed to water escape detection of some or all of a building or buildings. These aspects may, for example, be carried out from a single location. Further, such an approach (and related apparatus(es)) can be readily deployed in large high rise construction projects, and can be carried out in advance of the introduction of finishes to a building. In various implementations, this approach does away with the need of water escape detectors throughout a building. A remote and/or automated approach to disconnecting a water supply is used, with water still in the system being purged. This approach can reduce water damage, such as those due to delays from first responders.

Various embodiments are directed to controlling water flow, such as in a building under construction, while providing water for fire protection. Under such conditions and in some instances, water escapement from an active sprinkler head (prior to extinguishment or control) is detected as fire-related and allowed to continue. Other instances involve detecting active use of a standpipe system for firefighting purposes (e.g., firefighters connecting hoses to such a system and engaging water flow), and again water flow is allowed to continue. Both such instances may be detected and allowed to continue simultaneously (e.g., sprinkler water flow as well as water flow for firefighters' use). One or more of these approaches may involve determining that a fire and/or conditions conducive to a fire is or are present. For instance, where a fire may not be present in certain sprinkler system areas but a fire standpipe system is active for (e.g., verified) firefighting purposes, the sprinkler system may be disabled based on water escapement detection while the standpipe system is allowed to be utilized.

Various embodiments employ different shutoff valves in such circumstances, such as a valve for fire sprinkler water supply and another valve for standpipe system water supply. Further valves can be implemented for other non-firefighting water supply lines, and controlled using different schemes.

Certain embodiments further employ two or more shutoff valves within respective types of water supplies, such as to provide different zones for fire sprinklers or regular water supply, and to apply different control schemes based on conditions. For instance, floors of a building can each employ respective shutoff valves that are controlled based on occupancy and/or construction completion. Unoccupied floors undergoing construction can be managed for water escapement under a scheme in which detected water flow results in shutoff, whereas occupied floors can be managed to allow water flow. For fire sprinklers, zones of sprinklers in which no fire conditions have been detected may be operated such that detected water escapement results in shutoff of a corresponding water supply, whereas other zones in which fire conditions have been detected can be operated such that detected water escapement (or simply water flow) does not result in shutoff such. Other approaches with standpipe systems involve verification of operation, such as by a keyed engagement of the system by firefighting personnel (e.g., where a standard firefighting key can be used to switch a system to an "active" mode in which water escapement/flow does not result in valve shutoff).

For controlling fire system related water escapement, one or more of a variety of approaches may be used to determine whether a fire concern is real. In some embodiments, characteristics of an environment are used as part of an approach (e.g., algorithm) in determining whether to shut off a water supply. For instance, a type of construction can be used to determine a degree of risk from fire and accordingly used to set a control approach for water escapement. Wood frame construction can be more susceptible to fire than non-combustible type construction such as that involving metal framing. Further, different stages of construction may exhibit higher or lower degrees of fire risk. For instance, gypsum products (such as wall board) may be used to cover wood frame construction and therein lower fire risk. When further combustible products are added, such as millwork (e.g., wood trim or baseboard), paint, doors, wallcoverings, window treatments and furniture, fire risk increases. In addition, certain stages of construction involve enhanced fire risk, such as using heaters (e.g., propane) to dry wall board mudding, welding, storage and/or use of fuels or other combustible materials (such as combustible packaging), or application and drying of solvent-based stains or paints. Other stages or conditions of construction can be used to determine a water escapement control approach. For instance, the addition of sprinkler piping and heads, removing sprinkler head covers and installing escutcheon trims, finalizing main water service supplies, disconnecting temporary water service supplies (e.g., smaller piping brought in from a municipal hydrant), installing fire monitoring for a sprinkler system, removing a water leak detection system, obtaining sprinkler testing (and related certificates), and enabling fire protection are conditions that may be considered. Some stages present higher or lower fire risk, and some stages present higher or lower risk of water damage. In addition, other conditions may provide enhanced risk of fire or damage, such as upper level floors that provide greater risk of water damage due to possible water flow into underlying floors. These respective risks can be utilized in determining a water flow control approach. One or more of these considerations may in turn be used to set a threshold or other value that is utilized to determine a safe or otherwise acceptable approach to controlling water supply.

Another embodiment is directed to a verification system involving interaction with individuals in a protected environment. This verification system operates to generate a water flow alert, such as audible and/or visible cues, that attract attention and require interaction for water control. For instance, where a building is undergoing a working environment and a worker accidentally damages a fire sprinkler head such that water begins to flow out of the sprinkler head, a large audible alarm may sound to alert workers of the water escapement. These workers then interact with the system, wirelessly or otherwise, to confirm whether the water escapement is due to a damaged sprinkler head (and not a fire condition). In response, a water supply valve can be shut off. If no such interaction is detected, the water supply valve is allowed to continue to operate, providing flow (e.g., under conditions in which a sprinkler becomes active due to an actual fire condition).

In some embodiments, a water flow control apparatus as characterized herein is utilized as a sprinkler system flow detector, by indicating a fire condition or other condition that generates water flow/escapement. When such a detection occurs, the apparatus indicates an active fire condition (e.g., flow rate greater than a threshold pertaining to sprinkler operation, such as 10 USGPM). This may involve contacting a local fire department (and not shutting off a water supply).

In some implementations involving makeup systems or other components that utilize water flow intermittently, monitoring may be carried out using an algorithm or other approach that is time-based. For instance, short periods of high flow, as detected and predefined by time bounds based on expected utilization, can be detected yet not acted upon in the context of shutting off water supplies. Such an approach may, for example, pertain to water usage by a mechanical component that is expected and not indicative of water escapement (e.g., leaks or broken lines). Accordingly, intermittent high water consumption can be tolerated (e.g., for a limited time period of a certain number of seconds or minutes) can be ignored so long as the high consumption ceases within an allotted time period and returns to a steady state condition in which flow is at or less than a predetermined amount (e.g., 1~3 GPM) as may be set based on known conditions. In some instances, a predetermined amount corresponding to about no water flow may be utilized for unoccupied buildings with no equipment using water. Other amounts corresponding to normal or expected use for unoccupied or occupied buildings can be set accordingly. For instance, where an occupied building is expected to provide a certain average water flow over time, where that average is greatly exceeded for a time period, such conditions can be detected and evaluated as being related to a water escapement condition.

In various embodiments, an alarm is transmitted if water flow greater than a set point is detected. Such an approach may involve a set point in which (i) a flow level (3~5 GPM) and water flow has not lowered to a (ii) static flow level (1~3 GPM) for a duration greater than a (iii) maximum interval time (1~60 minutes). In various embodiments, a number of supervisory alarms and other verification metrics are utilized to: (i) prevent or detect tampering, (ii) set points of the system that may need adjustment, (iii) detect sub-system failures, (iv) provide remote measuring of the water flow rate, and (v) detect that flow rate has stopped after operating a shutoff valve.

A variety of communication system components are employed to suit particular applications. In some implementations, a water flow/escape detection and control system ("WFDCS") as characterized herein is located in below grade floors of a building where wireless communication is impractical. A wireless transmitter is mounted above grade and tethered to the WFDCS with power and communication wiring. A dual path for wireless transmission from two wireless service providers gives the system redundancy. In various embodiments, a WFDCS as characterized herein includes a test valve that provides a manner in which to test controls and calibrate set points.

Various embodiments are directed to an apparatus having a liquid flow detector circuit that detects liquid flow in a liquid channel, a liquid flow valve that controls the flow of liquid through the liquid channel in response to control inputs, and a flow-arresting circuit. The flow-arresting circuit operates with the liquid flow detector and liquid flow valve to, in response to the liquid flow detector indicating a liquid flow, control the liquid flow valve to mitigate the detected liquid flow based upon at least one input variable.

Each input variable is based on operational conditions of a premises in which the liquid flow is detected. Such an input variable may, for example, be based on operational conditions pertaining to one or more of: the presence or absence of personnel in the premises, a stage of construction, a stage of equipment operational characteristics, a type of construction material used in the premises, and a type of work being carried out on the premises (or may be provided based on such aspects). Such an input variable may be stored for access and indicative of a work schedule of a construction project in a premises, and provide a high flow threshold for delivering high flow rates during construction activities and a low flow threshold for delivering low flow rates when the premises is unoccupied.

Certain embodiments further include communication circuitry configured and arranged with the flow-arresting circuit to communicate with a remote user for providing one or more of: control of the flow-arresting circuit via provision of the input variable, and reporting of liquid flow characteristics provided by the flow-arresting circuit. Such communication circuitry may include local and a remote circuitry that interact with one another, in which the local circuitry provides flow rate type information to the remote circuitry, which in turn provides that information for user access and with a related user interface that obtains a user's response and sends a valve control communication back to the local circuit based on the response. Some embodiments further involve a liquid purge component that operates with the flow-arresting circuit to purge liquid from the liquid channel, in response to the liquid flow and based upon the operational conditions.

The flow-arresting circuit can be implemented in a variety of manners. In some embodiments, this circuit is a programmable circuit programmed to mitigate the detected liquid flow as follows. An amount of water flowing in the liquid channel is determined by converting an output signal from the liquid flow detector circuit into a value indicative of the amount of water flow. A threshold amount of flow is determined using the at least one input variable to select one of a plurality of predefined threshold amounts, therein determining the threshold amount based upon the operational conditions of the premises. In response to the determined amount of water flowing exceeding the threshold, a timer is initiated while continuing to determine the amount of water flowing by converting the output signal. In response to an amount of water flowing exceeding the threshold for a predetermined amount of time as indicated via the timer, a signal is sent to the liquid control valve that causes the liquid control valve to terminate the water flow. The flow-arresting circuit may further determine a type of water escapement based on a rate of water flow indicated by the liquid flow detector and a predefined relationship between different types of water escapement and rates of water flow.

In some embodiments, fire conditions are monitored by closing the liquid flow valve in response to detecting liquid flow above a first threshold indicative of water escapement and below a second threshold corresponding to an amount of liquid flow through a fire sprinkler. The liquid flow valve is controlled to allow liquid flow through the liquid channel in response to detecting liquid flow above the second threshold, therein determining that a fire sprinkler is active. The flow-arresting circuit may operate to control the liquid flow valve in response to commands received from the communication circuit (e.g., with a remote user providing control to shut down the valve or leave the valve open). In this or other contexts, the flow-arresting circuit may obtain the at least one variable from the remote user via the communication circuit, therein providing the control of the flow-arresting circuit via the remote user. In some instances, the flow-arresting circuit further operates with the communication circuit to report a rate of liquid flow detected by the liquid flow detector circuit, the rate being indicative of a type of water escapement.

In some implementations, the liquid flow detector circuit detects water flow in a fire protection water supply and in a domestic water supply that is separate from the fire protection water supply. For instance, the flow-arresting circuit may operate with the liquid flow valve to control the liquid flow valve to mitigate the detected liquid flow based on a first variable characterizing a fire protection condition (in response to detecting water flow in the fire protection water supply), and to control the liquid flow valve to mitigate the detected liquid flow based on a second variable that is different than the first variable (in response to detecting water flow in the domestic water supply). In some instances, a fire condition detection input variable indicating the presence (and absence) of fire conditions including one or more of smoke and heat is used to control flow in fire supply lines. For example, one or more of a smoke detection circuit and a heat detection circuit can be used to respectively generate a signal in response to smoke or heat exceeding a threshold indicative of fire, with the flow-arresting circuit utilizing a signal generated by one or more of the smoke detection circuit and heat detection circuit as the fire detection input variable.

Various embodiments involve or otherwise include one or more aspects as characterized in U.S. Provisional Patent Application Ser. No. 62/187,578, entitled "Flood Detection," to which priority is claimed and which is fully incorporated herein by reference. For instance, operational characteristics as noted therein, relating to user interaction and control and/or specific conditions upon which operations are based, can be implemented with the apparatuses shown in the figures and characterized herein, as well as with related methods.

Turning now to the figures, FIG. 1 shows an example apparatus 100 involving the direction of incoming service (temporary or permanent) directly to WFDCS circuitry 110, and through its metering device that monitors water consumption of the building. A valve 120 is coupled to an incoming water supply, which then flows through the WFDCS 110. A power supply 112 provides power to the WFDCS 110, and water purge component 114 may be utilized to facilitate purging of water to which the WFDCS is coupled. In some instances, a flange diverter 125 is coupled to the WFDCS 110 to facilitate decoupling and recoupling of the WFDCS. A communicator 130 may be coupled to the WFDCS 110, and utilized to communicate signals indicative of water escapement or other water flow conditions as characterized herein. Such a communication 130 may, by way of example, be implemented as a wireless communication circuit that communicates over cellular telephone systems, or may otherwise be implemented with other wireless or wired technologies.

After the WFDCS the water then reconnects to a building piping system. FIG. 1 shows two systems by way of example, including a domestic water supply system 140 and a fire sprinkler system 150 (with a back flow preventer 152). The domestic water supply may, for example, include water piping to kitchen and bathroom areas. The fire sprinkler system 150 may include water piping to sprinkler heads and other fire-protection type water access points.

One or more components as shown in FIG. 1 may be implemented separately, as standalone embodiments. For instance, the WFDCS 110 itself may be implemented as an embodiment, which may be utilized in a variety of different systems, with different valves (e.g., as characterized above), different communications and different power supplies. Other embodiments are directed to a combination of the WFDCS 110 and shutoff valve 120 along with controls/coupling therebetween.

During the work day the system may not be monitored, and can be armed on schedule or based on work day occupancy (e.g., based on manual input and/or utilizing presence detection circuitry). When the workmen leave the site the water consumption is analyzed to detect water flow indicative of water escaping. This detection may involve utilizing a threshold escapement such as 3~5 GPM (gallons per minute) as may be indicative of a broken water component such as a supply line, joint, coupler or sprinkler head.

Apparatuses and/or systems as characterized herein may be employed for temporary use and removed after occupancy of a building. In some embodiments, such as for commercial office space, the system may remain in place to monitor on a permanent basis (e.g., for leaks that may occur when the building is usually unoccupied). Problem water systems that are causing excessive water loss can also be detected (e.g., leaking toilets, or make-up water systems that are running continuously), with information being provided on the scope of the problem and the timing of the condition to direct plumbers to effect repairs as soon as they develop. As such, certain embodiments are directed to detecting and reporting water escapement, without necessarily shutting off a water supply.

Figure 2:
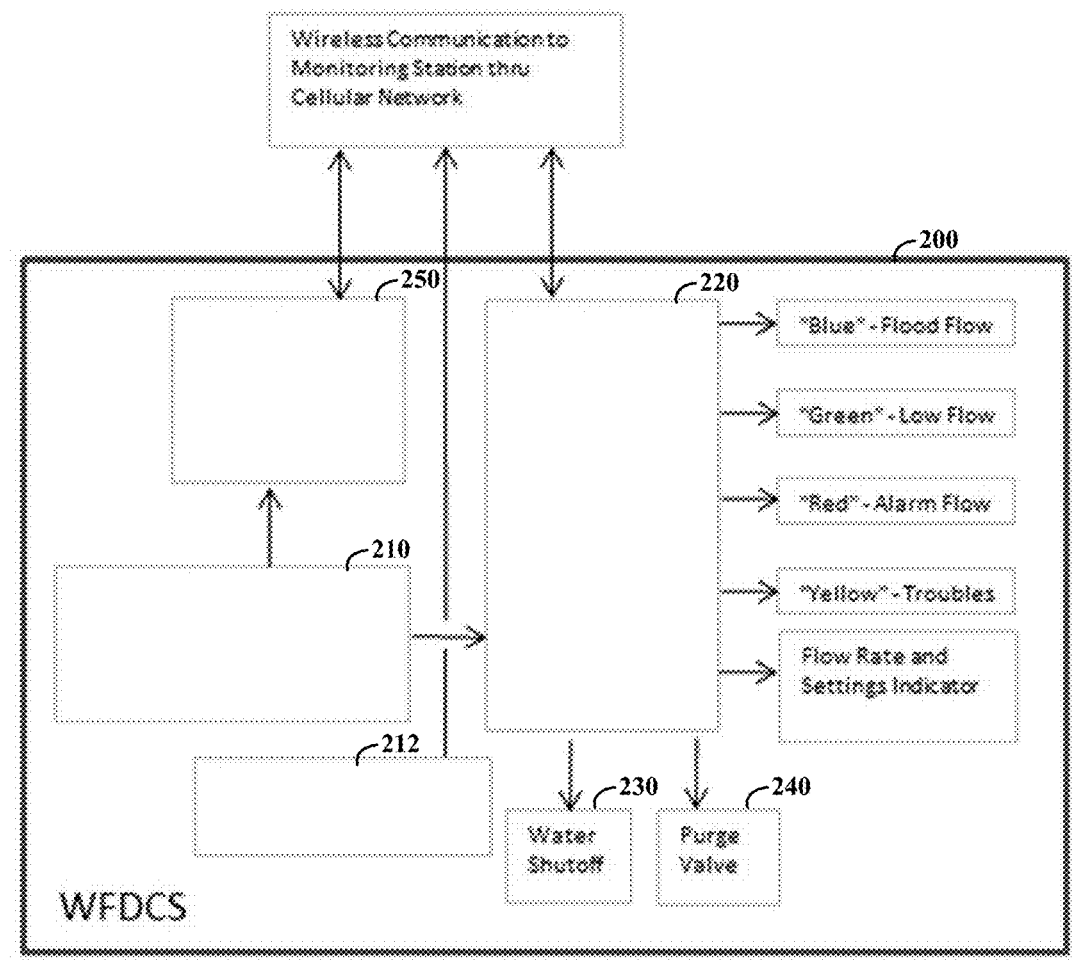
FIG. 2 shows an exemplary functional block for flow/escape detection, in accordance with one or more embodiments.

FIG. 2 shows an exemplary circuit module 200 for a WFDCS, in accordance with one or more embodiments. The circuit module 200 may, for example, be implemented as WFDCS 110 in FIG. 1. The circuit module 200 includes a metering pulse device 210, which may be sized for a particular application (e.g., a 2" construction inlet with 150 GPM maximum flow, and low flow of 1GPM). A power supply 212 provides power to the metering pulse device 210, which provides an output characterizing water flow to flow monitoring circuit 220, which carries out one or more of a variety of evaluations based on the characterized flow and related programming. For instance, the flow monitoring circuit 220 may operate to determine low flow, flood flow, and alarm flow conditions and generate related alerts as shown (e.g., a visible blue, green or red alert), based on thresholds for such conditions. Other conditions, such as a trouble condition (e.g., a sensor being disconnected) can be detected and used to provide a related indication (e.g., yellow light), and can provide an output indicative of actual flow rate and/or settings as noted.

The flow monitoring circuit 220 may further be used to control one or more valves based on detected conditions. For instance, where a threshold flow of 3GPM is set as triggering a shutdown event, detection of such flow results in the generation of an output that controls a water shutoff valve/circuitry 230 (e.g., a solenoid valve). This condition may further generate operation of a purge valve 240, which can be used to remove water from the system.

Calibration inputs, as well as other programming inputs, can be provided to flow monitoring circuit 220 to set its operation, as may be carried out in accordance with aspects noted herein with regard to risk assessment and related operations involving water shutoff. Certain embodiments further involve flow rate metering circuitry 250 that is responsive to queries, such as internet queries, from an external monitoring station (or its operator). External wireless communications can be generated directly within the componentry as shown or with an external component to which the apparatus 200 is coupled.

In some implementations, an algorithm as follows is implemented with FIG. 2. An indication of water flow is provided from metering pulse device 210. The flow monitoring circuit 220 utilizes the indication by processing an input thereof to provide an indication of water flow. In some instances, such water flow is compared against a threshold and, if the threshold is exceeded, an alarm condition is generated. A low-flow threshold can also be used in this context. Different thresholds can be provided, for example, for low flow, flood flow and alarm flow conditions, in response to which alerts as shown are generated. In other instances, the water flow is processed together at flow monitoring circuit 220 with information characterizing the application, such as related to a stage of construction, type of construction, and state of occupation, and an output to water shutoff valve/circuitry 230 is controlled in response there to. For instance, under conditions in which motion or other presence sensing is used, an input indicative of presence sensing, processed with an input indicating water flow rate, is used to generate an output based on a defined water flow threshold for the condition of presence sensing.

Figure 3:
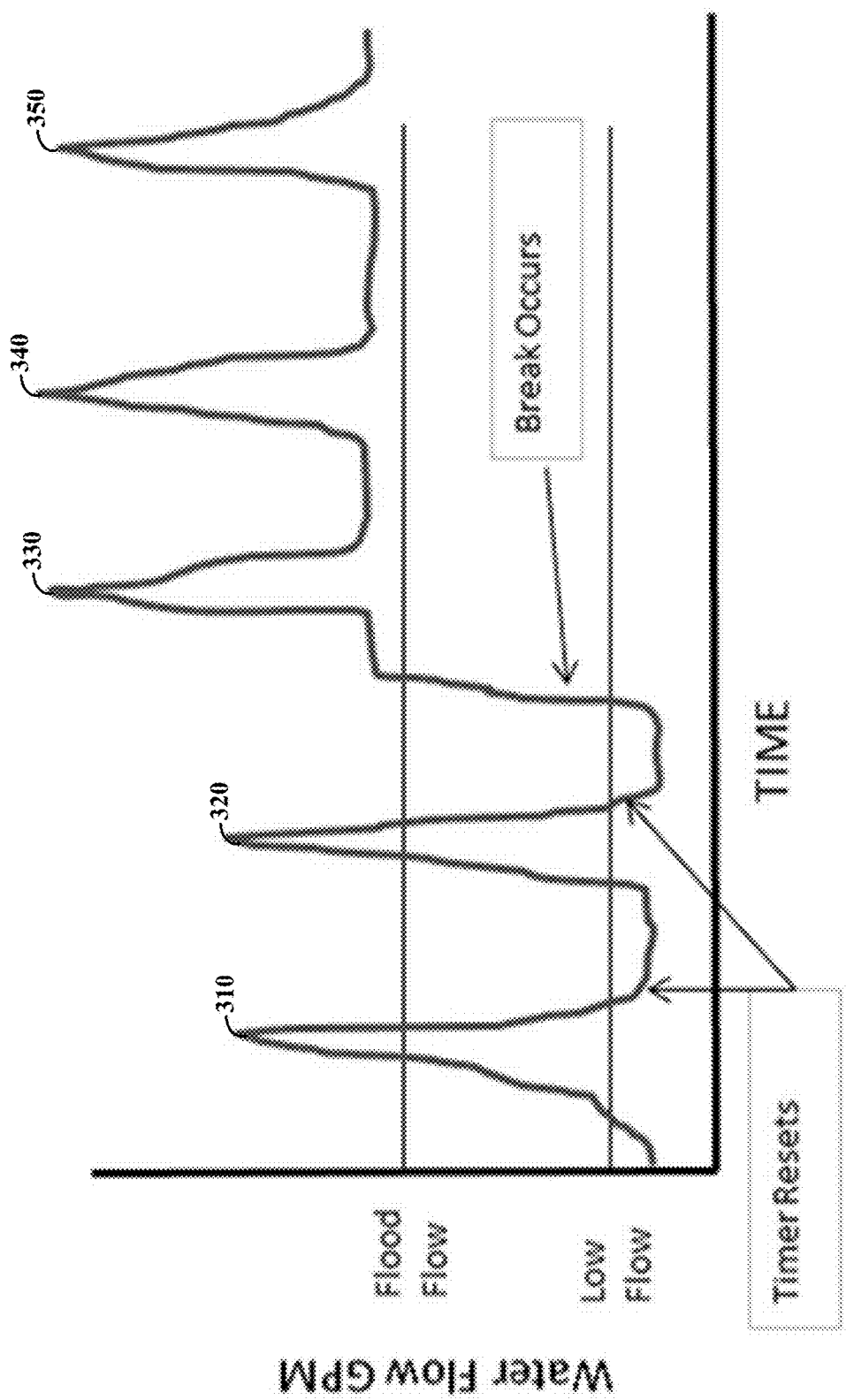
FIG. 3 shows an exemplary approach to operating an apparatus and/or system for detecting water or other liquid escape, as may be implemented in accordance with one or more embodiments.

FIG. 3 shows a plot exhibiting an approach to controlling the operation of a system for detecting water escape, as may be implemented in accordance with one or more embodiments. The vertical axis shows water flow in GPM, and the horizontal axis shows time. Low flow and flood flow thresholds are also represented. As shown, peaks 310 and 320 extend over the flood flow threshold, but are limited in time. Such conditions may thus be ignored as being an actual water use condition, rather than water escapement. A timer may be initiated above the low flow condition, and reset when the low flow condition is met again. So long as the timer does not reach a threshold, water escapement is not noted as occurring. However, if a break occurs as shown, the overall water flow increases as shown with peaks at 330, 340 and 350, with a water escapement condition shifting the cyclic use of water above the flood threshold. This condition is detected over time as a break or other malfunction in a water supply system, sprinkler system or whatever system is being monitored.

In some implementations, a controller circuit implemented with the approach shown in FIG. 3 operates in two modes: (i) Operating Mode, (ii) Calibration Mode. The controller includes a digital display that provides calibration of the apparatus set points and local confirmation of signals and flow rates received by the monitoring station: (i) actual water flow (0.0~200.0 GPM), (ii) flow set point (1.0~5.0 GPM), (iii) low flow set point (1.0~2.0 GPM), (iv) maximum time interval between low flow set point (60~3600 Seconds), and (v) time interval remaining (seconds). The three set points (ii, iii, and iv above) can be adjusted in the firmware in the controller for acceptable ranges.

Control of an apparatus and approach as characterized herein can be implemented in a variety of manners. In some embodiments, controls are in a locked cabinet that includes a tamper component that is remotely monitored to detect tampering by unauthorized individuals. Exterior indicator lights on the controller may be provided to indicate: (i) "Blue" Leak Flow, (ii) "Green" Low Flow, (iii) "Red" Alarm Flow, (iv) "Yellow" Trouble Alarms. Inside the cabinet actual flow rates in GPM can be viewed along with the flow set points for "Leak Flow", "Low Flow", and "Maximum Timer Interval" set point.

A variety of monitoring approaches and algorithms can be implemented to suit particular embodiments. For instance, construction progress can impact normal work schedules, so the monitoring adjusts for these changes to ignore alarms that are indicative of normal water flow for workers using water service for operations such as clean-up, masonry work, testing of the plumbing system, and concrete cutting. When the building is unoccupied the WFDCS can be armed and if water escape alarms are received an action plan is followed.

Figure 4:
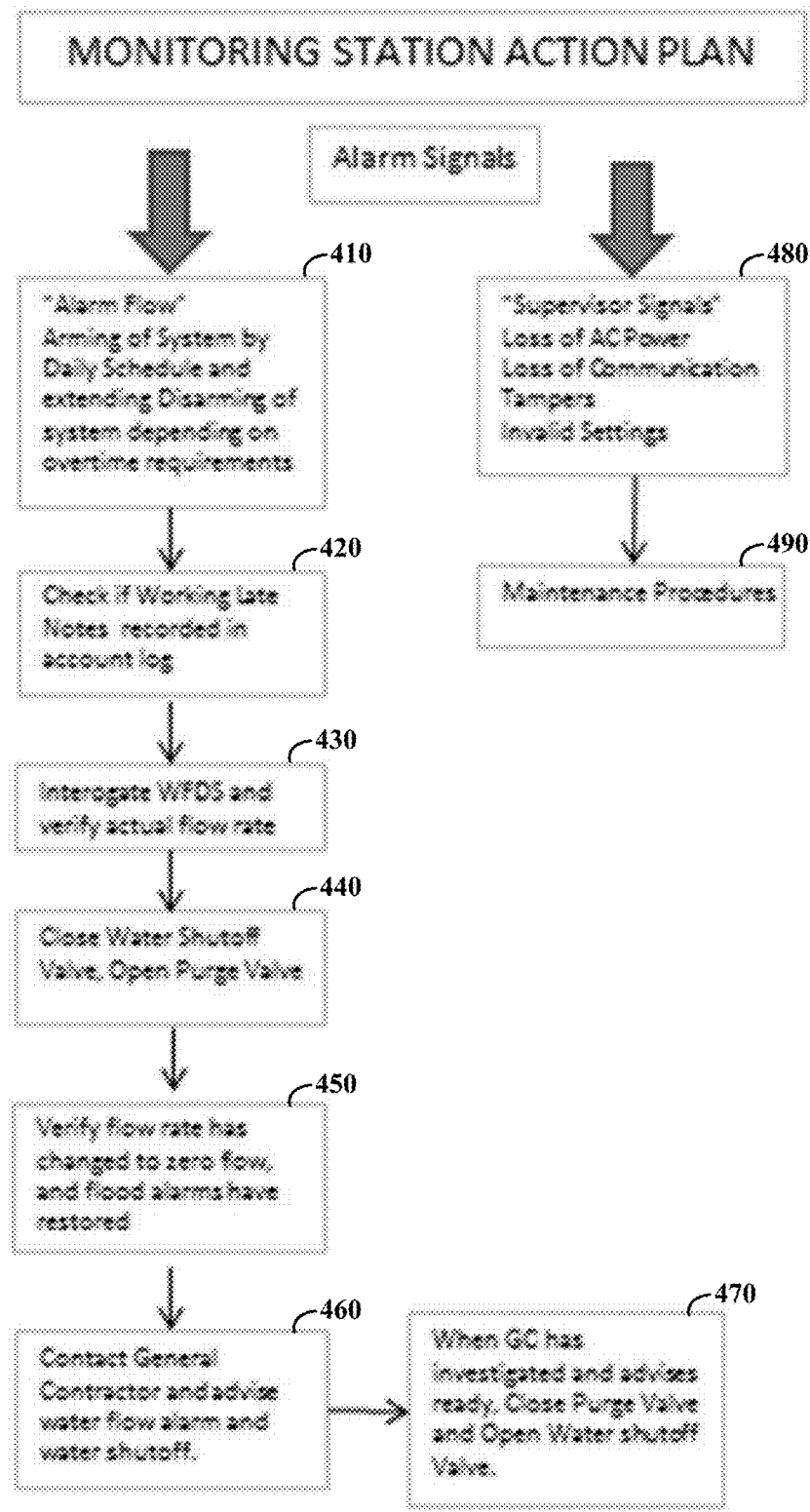
FIG. 4 shows an approach for flow/escape detection, in accordance with one or more embodiments.

FIG. 4 shows an exemplary action plan/algorithm as may be implemented in accordance with one or more embodiments. In some embodiments, an action plan includes arming a system at block 410 and checking if late working has been noted in an account log at block 420 (e.g., to identify the presence of workers and expected use of water). Water flow is verified at block 430 by interrogating a flow meter to measure actual flow. If a water escapement scenario is detected, a water shutoff and purge of system stack are activated at block 440. Once flow has changed to zero flow (or below a threshold), flood alarms are restored at block 450. At block 460, a communication is generated, such as to a general contractor, to indicate a water flow alarm and shutoff (which can be carried out while a purge valve remains open). At block 470, water supply is restored such as by closing a purge valve (if open) and opening a shutoff valve. Other signals may be generated as shown, with various conditions (e.g., loss of power or communication, tampering or invalid settings) reported at block 480, and maintenance procedures may be initiated at block 490.

Various embodiments are directed to addressing issues related to false alarms. Such approaches can be implemented in connection with a plan as noted above, with various operational characteristics being implemented to suit embodiments in which certain activities are deemed normal (not alarm-raising). Alarm conditions can be adjusted for high flows during certain periods, and lower flows during other periods.

Various embodiments also address issues relating to one or more of the following: (i) a large building with many floors requires many sensors and connected wiring making the costs significantly greater than this application device, (ii) a building is in a state of constant change while in construction, and daily activities would render installing a network of sensors and wires prone to tampering and interference by trades workers installing componentry in proximity to the sensor of finished walls, millwork and flooring, (iii) manual reset requirements after each operation, (iv) battery powered devices that are not monitored if the system power has failed.

In addition, the various embodiments described herein may be combined in certain embodiments, and various aspects of individual embodiments may be implemented as separate embodiments. For instance, aspects of FIG. 1 may be implemented with the approaches shown in FIGS. 2-4.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., monitoring, modifying monitoring plans or alarm conditions, or controlling water supplies). For example, in certain of the above-discussed embodiments, one or more modules are discrete logic circuits or programmable logic circuits configured and arranged for implementing these operations/activities, as in a circuit module implemented as the WFDCS 110 in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

The skilled artisan would recognize that various terminology as used in the specification (including claims) connote a plain meaning in the art unless otherwise indicated. As examples, the specification describes and/or illustrates aspects useful for implementing the claimed disclosure by way of various circuits or circuitry which may be illustrated as or using terms such as blocks, modules, device, system, unit, or controller (e.g., reference numeral 110 of FIG. 1, and 210-250 of FIG. 2). Such circuits or circuitry are used together with other elements to exemplify how certain embodiments may be carried out in the form or structures, steps, functions, operations, activities, etc.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, multiple monitoring locations may be implemented in a common or different premises. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
   a liquid flow detector circuit configured and arranged to detect liquid flow in a liquid channel;
   a liquid flow valve configured and arranged to control the flow of liquid through the liquid channel in response to control inputs;
   a flow-arresting circuit configured and arranged with the liquid flow detector and liquid flow valve to, in response to the liquid flow detector indicating a liquid flow, control the liquid flow valve to mitigate the detected liquid flow based upon at least one input variable, each input variable being based on operational conditions of a premises in which the liquid flow is detected;
   a liquid purge component configured and arranged with the flow-arresting circuit to purge liquid from the liquid channel, in response to the liquid flow and based upon the operational conditions; and
   a communication circuit configured and arranged with the flow-arresting circuit to communicate with a remote user for providing one or more of: control of the flow-arresting circuit via provision of the input variable, and reporting of liquid flow characteristics provided by the flow-arresting circuit.

2. The apparatus of claim 1, wherein the flow-arresting circuit is a programmable circuit configured and arranged to mitigate the detected liquid flow by:
   determining an amount of water flowing in the liquid channel by converting an output signal from the liquid flow detector circuit into a value indicative of the amount of water flow;
   determining a threshold amount of flow by using the at least one input variable to select one of a plurality of predefined threshold amounts, therein determining the threshold amount based upon the operational conditions of the premises;
   in response to the determined amount of water flowing exceeding the threshold, initiating a timer while continuing to determine the amount of water flowing by converting the output signal; and
   in response to amount of water flowing exceeding the threshold for a predetermined amount of time as indicated via the timer, sending a signal to the liquid control valve that causes the liquid control valve to terminate the water flow.

3. The apparatus of claim 1, wherein the at least one input variable is based on operational conditions pertaining to one or more of: the presence or absence of personnel in the premises, a stage of construction, a stage of equipment operational characteristics, a type of construction material used in the premises, and a type of work being carried out on the premises.

4. The apparatus of claim 1, wherein the flow-arresting circuit is configured and arranged to control the liquid flow valve in response to commands received from the communication circuit.

5. The apparatus of claim 1, wherein the flow-arresting circuit is configured and arranged to obtain the at least one variable from the remote user via the communication circuit, therein providing the control of the flow-arresting circuit via the remote user.

6. The apparatus of claim 1, wherein the flow-arresting circuit is configured and arranged with the communication circuit to report the liquid flow characteristics by reporting a rate of liquid flow detected by the liquid flow detector circuit, the rate being indicative of a type of water escapement.

7. The apparatus of claim 1, wherein the flow-arresting circuit is configured and arranged to determine a type of water escapement based on a rate of water flow indicated by the liquid flow detector and a predefined relationship between different types of water escapement and rates of water flow.

8. An apparatus comprising:
   a liquid flow detector circuit configured and arranged to detect water flow in a fire protection water supply and to detect water flow in a potable water supply that is separate from the fire protection water supply;
   a liquid flow valve configured and arranged to control the flow of liquid through the liquid channel in response to control inputs;
   a flow-arresting circuit configured and arranged with the liquid flow detector and liquid flow valve to, in response to the liquid flow detector indicating a liquid flow, control the liquid flow valve to mitigate the detected liquid flow based upon at least one input variable, each input variable being based on operational conditions of a premises in which the liquid flow is detected; and
   a communication circuit configured and arranged with the flow-arresting circuit to communicate with a remote user for providing one or more of: control of the flow-arresting circuit via provision of the input variable, and reporting of liquid flow characteristics provided by the flow-arresting circuit.

9. The apparatus of claim 8, wherein the flow-arresting circuit is configured and arranged with the liquid flow valve to:
in response to detecting water flow in the fire protection water supply, control the liquid flow valve to mitigate the detected liquid flow based on a first variable characterizing a fire protection condition; and
in response to detecting water flow in the potable water supply, control the liquid flow valve to mitigate the detected liquid flow based on a second variable that is different than the first variable.

10. The apparatus of claim 9, wherein the flow-arresting circuit is configured and arranged with the liquid flow valve to mitigate the detected liquid flow in response to detecting the water flow in the fire protection water supply based on a fire condition detection input variable indicating the presence of fire conditions including one or more of smoke and heat.

11. The apparatus of claim 10, further including one or more of a smoke detection circuit configured and arranged to generate a signal in response to the presence of smoke, and a heat detection circuit configured an arranged to generate a signal in response to heat exceeding a threshold indicative of fire, wherein the flow-arresting circuit is configured and arranged to utilize a signal generated by one or more of the smoke detection circuit and heat detection circuit as the fire detection input variable.

12. An apparatus comprising:
a liquid flow detector circuit configured and arranged to detect liquid flow in a liquid channel;
a liquid flow valve configured and arranged to control the flow of liquid through the liquid channel in response to control inputs;
a flow-arresting circuit configured and arranged with the liquid flow detector and liquid flow valve to, in response to the liquid flow detector indicating a liquid flow, control the liquid flow valve to mitigate the detected liquid flow based upon at least one input variable, each input variable being based on operational conditions of a premises in which the liquid flow is detected, wherein the at least one input variable is stored for access by the flow-arresting circuit and is indicative of a work schedule of a construction project in the premises, the at least one input variable providing a high flow threshold for delivering high flow rates during scheduled construction activities and providing a low flow threshold for delivering low flow rates when construction activities are not scheduled; and
a communication circuit configured and arranged with the flow-arresting circuit to communicate with a remote user for providing one or more of: control of the flow-arresting circuit via provision of the input variable, and reporting of liquid flow characteristics provided by the flow-arresting circuit.

13. An apparatus comprising:
a liquid flow detector circuit configured and arranged to detect liquid flow in a liquid channel;
a liquid flow valve configured and arranged to control the flow of liquid through the liquid channel in response to control inputs;
a flow-arresting circuit configured and arranged with the liquid flow detector and liquid flow valve to, in response to the liquid flow detector indicating a liquid flow, control the liquid flow valve to mitigate the detected liquid flow based upon at least one input variable, each input variable being based on operational conditions of a premises in which the liquid flow is detected, wherein the flow-arresting circuit is configured and arranged with the liquid flow detector circuit to monitor fire conditions by:
in response to detecting liquid flow above a first threshold indicative of water escapement and below a second threshold corresponding to an amount of liquid flow through a fire sprinkler, closing the liquid flow valve, and
in response to detecting liquid flow above the second threshold, determining that a fire sprinkler is active and controlling the liquid flow valve to allow liquid flow through the liquid channel; and
a communication circuit configured and arranged with the flow-arresting circuit to communicate with a remote user for providing one or more of: control of the flow-arresting circuit via provision of the input variable, and reporting of liquid flow characteristics provided by the flow-arresting circuit.

14. A method comprising:
detecting liquid flow in a liquid channel;
controlling the flow of liquid through the liquid channel with a liquid flow valve in response to control inputs;
in response to the detected liquid flow, controlling the liquid flow valve to mitigate the detected liquid flow based upon at least one input variable, each input variable being based on operational conditions of a premises in which the liquid flow is detected;
purging liquid from the liquid channel in response to the liquid flow and based upon the operational conditions; and
communicating with a remote user for providing one or more of: control of the liquid flow via provision of the input variable, and reporting of liquid flow characteristics provided by the flow-arresting circuit.

15. The method of claim 14, wherein mitigating the detected liquid flow includes:
determining an amount of water flowing in the liquid channel by converting an output signal from a liquid flow detector circuit into a value indicative of the amount of water flow;
determining a threshold amount of flow by using the at least one input variable to select one of a plurality of predefined threshold amounts, therein determining the threshold amount based upon the operational conditions of the premises;
in response to the determined amount of water flowing exceeding the threshold, initiating a timer while continuing to determine the amount of water flowing by converting the output signal; and
in response to an amount of water flowing exceeding the threshold for a predetermined amount of time as indicated via the timer, sending a signal to the liquid control valve that causes the liquid control valve to terminate water flow.

16. The method of claim 14, wherein
communicating with a remote user includes reporting a rate of detected liquid flow, the rate being indicative of a type of water escapement, and
controlling the liquid flow valve to mitigate the detected liquid flow based upon the at least one input variable includes controlling the liquid flow valve based upon an input variable provided by a remote user in response to the reported rate of detected flow and based on the operational conditions of the premises.

17. A method comprising
detecting liquid flow in a liquid channel;
controlling the flow of liquid through the liquid channel with a liquid flow valve in response to control inputs;
in response to the detected liquid flow, controlling the liquid flow valve to mitigate the detected liquid flow based upon at least one input variable, each input variable being based on operational conditions of a premises in which the liquid flow is detected, by
   in response to detecting water flow in a fire protection water supply, controlling the liquid flow valve to mitigate the detected liquid flow based on a first variable characterizing a fire protection condition; and
   in response to detecting water flow in a potable water supply, controlling the liquid flow valve to mitigate the detected liquid flow based on a second variable that is different than the first variable; and
communicating with a remote user for providing one or more of: control of the liquid flow via provision of the input variable, and reporting of liquid flow characteristics provided by the flow-arresting circuit.

18. A method comprising:
detecting liquid flow in a liquid channel;
controlling the flow of liquid through the liquid channel with a liquid flow valve in response to control inputs;
in response to the detected liquid flow, controlling the liquid flow valve to mitigate the detected liquid flow based upon at least one input variable, each input variable being based on operational conditions of a premises in which the liquid flow is detected;
monitoring fire conditions by:
   in response to detecting liquid flow above a first threshold indicative of water escapement and below a second threshold corresponding to an amount of liquid flow through a fire sprinkler, closing the liquid flow valve, and
   in response to detecting liquid flow above the second threshold, determining that a fire sprinkler is active and controlling the liquid flow valve to allow liquid flow through the liquid channel; and
communicating with a remote user for providing one or more of: control of the liquid flow via provision of the input variable, and reporting of liquid flow characteristics provided by the flow-arresting circuit.

\* \* \* \* \*